United States Patent
Tan et al.

(10) Patent No.: US 9,818,289 B2
(45) Date of Patent: Nov. 14, 2017

(54) METHOD, DEVICE AND STORAGE MEDIUM FOR REMINDING IN SHUTDOWN STATE

(71) Applicant: Xiaomi Inc., Beijing (CN)

(72) Inventors: Kangxi Tan, Beijing (CN); Li He, Beijing (CN); Hong Ji, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/228,400

(22) Filed: Aug. 4, 2016

(65) Prior Publication Data

US 2017/0053517 A1 Feb. 23, 2017

(30) Foreign Application Priority Data

Aug. 19, 2015 (CN) .......................... 2015 1 0512477

(51) Int. Cl.
| | |
|---|---|
| *G08B 1/00* | (2006.01) |
| *G08B 21/24* | (2006.01) |
| *G06F 1/32* | (2006.01) |
| *H04M 1/725* | (2006.01) |
| *H04W 52/02* | (2009.01) |
| *G06F 9/44* | (2006.01) |

(52) U.S. Cl.
CPC ............. *G08B 21/24* (2013.01); *G06F 1/329* (2013.01); *G06F 1/3287* (2013.01); *G06F 9/442* (2013.01); *H04M 1/72566* (2013.01); *H04W 52/0274* (2013.01); *G06F 9/4418* (2013.01); *Y02B 60/1282* (2013.01); *Y02B 60/144* (2013.01); *Y02B 60/186* (2013.01); *Y02B 60/50* (2013.01)

(58) Field of Classification Search
CPC ............................... G06F 1/3287; G06F 1/329

USPC ...................................................... 340/309.7
See application file for complete search history.

(56) References Cited

U.S. PATENT DOCUMENTS

| | | | |
|---|---|---|---|
| 8,316,253 B2 | 11/2012 | May et al. | |
| 9,589,454 B2* | 3/2017 | Vaidhyanathan | G08B 27/00 |
| 2007/0060205 A1* | 3/2007 | Kim | G06Q 10/02 |
| | | | 455/566 |
| 2010/0100754 A1 | 4/2010 | May et al. | |
| 2012/0117406 A1* | 5/2012 | Eun | H04W 52/0216 |
| | | | 713/323 |
| 2013/0040611 A1* | 2/2013 | Rega | H04M 1/72566 |
| | | | 455/413 |

(Continued)

FOREIGN PATENT DOCUMENTS

| | | |
|---|---|---|
| CN | 1809079 A | 7/2006 |
| CN | 101909112 A | 12/2010 |

(Continued)

OTHER PUBLICATIONS

Extended European Search Report dated Dec. 22, 2016 for European Application No. 16184988.0, 8 pages.

(Continued)

*Primary Examiner* — Santiago Garcia
(74) *Attorney, Agent, or Firm* — Brinks, Gilson & Lione

(57) ABSTRACT

The present disclosure relates to controlling a mobile device to provide a reminder even when the mobile device experiences a shutdown state. By controlling the mobile device to provide the reminder even when the mobile device experiences a shutdown state, the reminder may still be presented on the mobile device when an operating system of the mobile device has not been initiated.

17 Claims, 15 Drawing Sheets

(56) References Cited

U.S. PATENT DOCUMENTS

| | | | | |
|---|---|---|---|---|
| 2013/0321122 | A1* | 12/2013 | Lee | G01S 5/0009 340/3.1 |
| 2014/0120896 | A1* | 5/2014 | Park | H04M 1/72558 455/418 |
| 2014/0266607 | A1* | 9/2014 | Olodort | G08B 6/00 340/7.6 |
| 2015/0016233 | A1 | 1/2015 | Gu et al. | |
| 2015/0135088 | A1* | 5/2015 | Lim | G06F 3/0484 715/745 |
| 2015/0138101 | A1* | 5/2015 | Park | G06F 3/0412 345/173 |
| 2015/0235542 | A1* | 8/2015 | Su | H04W 52/0229 340/506 |
| 2016/0293168 | A1* | 10/2016 | Chen | G10L 15/22 |
| 2017/0018276 | A1* | 1/2017 | Gunn | G10L 15/22 |
| 2017/0055208 | A1* | 2/2017 | Chen | H04W 52/02 |

FOREIGN PATENT DOCUMENTS

| | | |
|---|---|---|
| CN | 102693130 A | 9/2012 |
| CN | 202748774 U | 2/2013 |
| CN | 103164223 A | 6/2013 |
| CN | 104184908 A | 12/2014 |
| CN | 104683573 A | 6/2015 |
| CN | 105117897 A | 12/2015 |
| EP | 1 643 358 A1 | 4/2006 |
| EP | 2 395 807 A1 | 12/2011 |
| JP | 2002-303688 A | 10/2002 |
| JP | 2003-029886 A | 1/2003 |
| JP | 2005-352865 A | 12/2005 |
| JP | 2008-066810 A | 3/2008 |
| WO | WO 2014-026620 A1 | 2/2014 |

OTHER PUBLICATIONS

International Search Report and Written Opinion dated May 19, 2016 for International Application No. PCT/CN2015/099044, 22 pages.

Office Action dated Sep. 5, 2017 for Japanese Application No. 2016-530992, 4 pages.

* cited by examiner

METHOD, DEVICE AND STORAGE MEDIUM FOR REMINDING IN SHUTDOWN STATE

This application claims priority to Chinese Patent Application Serial No. 201510512477.2, filed on Aug. 19, 2015, the entirety of which is hereby incorporated by reference herein.

FIELD

The present disclosure relates to a communication technology field, and more particularly to a method, a device, a system and a storage medium for controlling the operation of a mobile device to provide reminders for a user on the mobile device during various operational states of the mobile device.

BACKGROUND

User applications on mobile devices offer various features for managing and organizing daily user activities and tasks when the mobile device is in a powered on state or a powered off state. A reminder function for presenting a reminder to a user of the mobile device at a preset time is an example of such a feature that may be available from such a user application executing on the mobile device

SUMMARY

According to one embodiment of the present disclosure, a method for providing reminders during a shutdown state of a mobile device is provided. The method includes receiving a wakeup instruction from a clock circuit in a shutdown state, executing a preset initialization operation according to the wakeup instruction, in which the preset initialization operation does not include starting an operating system, and executing a preset reminder program according to a pre-stored reminder event after the preset initialization operation is completed.

According to another embodiment of the present disclosure, a device for providing reminders during a shutdown state of a mobile device is provided. The device includes an instruction receiving unit, configured to receive a wakeup instruction from a clock circuit in a shutdown state, an operation executing unit, configured to execute a preset initialization operation according to the wakeup instruction, in which the preset initialization operation does not include starting an operating system, and an event reminder unit, configured to execute a preset reminder program according to a pre-stored reminder event after the preset initialization operation is completed.

According to another embodiment of the present disclosure, a device for providing reminders during a shutdown state of a mobile device is provided. The device includes a processor, and a memory, configured to store instructions executable by the processor to: receive a wakeup instruction from a clock circuit in a shutdown state, execute a preset initialization operation according to the wakeup instruction, in which the preset initialization operation does not include starting an operating system, and execute a preset reminder program according to a pre-stored reminder event after the preset initialization operation is completed.

According to another embodiment the present disclosure, there is provided a non-transitory computer readable storage medium having stored therein instructions that, when executed by a processor of a mobile device, cause the mobile device to perform a method for providing a reminder in a shutdown state of a mobile device, the method including receiving a wakeup instruction from a clock circuit in a shutdown state, executing a preset initialization operation according to the wakeup instruction, in which the preset initialization operation does not comprise starting an operating system; and executing a preset reminder program according to a pre-stored reminder event after the preset initialization operation is completed.

It should be understood that, the above general description and following detail description are exemplary and explanatory, and shall not be construed to limit the present disclosure.

DETAILED DESCRIPTION

Figure 1:
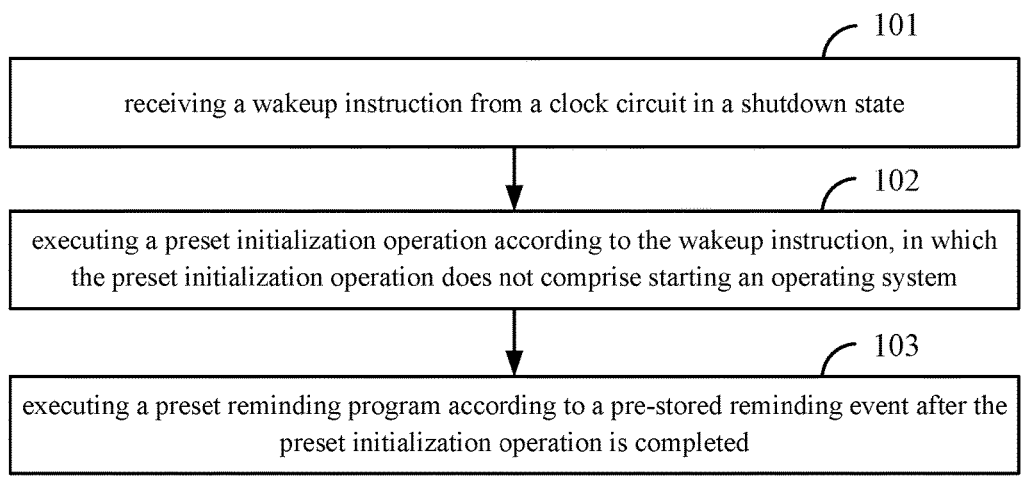
FIG. 1 illustrates a flow chart of a method for providing a reminder while a device is in a shutdown state according to an example embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

Although terms such as "first" and "second" are used herein for describing various elements, these elements should not be limited by these terms. These terms are only used for distinguishing one element from another element. For example, a first sequencing criterion may also be called a second sequencing criterion, and similarly, the second sequencing criterion may also be called the first sequencing criterion, without departing from the scope of the present disclosure. As used herein, the term "if" may be construed to mean "when" or "upon" or "in response to determining" or "in accordance with a determination" or "in response to detecting," that a stated condition precedent is true, depending on the context.

In the embodiments of the present disclosure, a wakeup instruction is received from a clock circuit during or after a shutdown state of a mobile device, a preset initialization operation is executed according to the wakeup instruction, and a preset reminder program is executed according to a pre-stored reminder event after the preset initialization operation is completed, such that the reminder event may still be provided even if an operating system of the mobile device is not started or currently running. The wakeup instruction may be change in voltage level on a general purpose input/output (GPIO) pin on an integrated circuit of a controller or processing unit included in the mobile device. The shutdown state may be described as an operating state of the mobile device where only certain predetermined components (e.g., only the clock circuit and those other components configured to operate the clock circuit) is operational and receiving power. The reminder program may be a program run outside of the operating system. The operating system may be a layer of operational software logic that manages hardware components of the mobile device, and also provides a foundational platform on which applications or programs may run. The operating system may also manage certain system applications for configuring attributes of the operating system or mobile device. In addition, or as part of the operating system, the mobile device may also include firmware. Firmware may be operational software logic stored on a memory (e.g., flash memory, or a type of read only memory) of a hardware component of the mobile device that controls certain features of the hardware component.

Therefore, a time-consuming problem and an electricity-consuming problem caused by starting the operating system may be avoided, electric energy may be saved, and meanwhile a call function will not be started, radiofrequency radiation may be prevented, and the user experience is improved.

FIG. 1 shows a flow diagram 100 describing another method for providing a reminder during or after a shutdown state of a mobile device according to an example embodiment of the present disclosure. As shown in FIG. 1, the method may be used in the mobile device, including steps as follows.

In step 101, a wakeup instruction is received from a clock circuit during or after a shutdown state of a mobile device.

The mobile device in the present disclosure may be for example, a smart phone, a tablet computing device, a PDA (Personal Digital Assistant) computing device, or other computing device.

In the mobile device, a reminder program, which is not dependent upon an operating system and may operate independently, is installed on the mobile device with preset configurations. The preset reminder program is configured for providing reminders. For example, the reminder program may be an alarm program, a calendar program, a reminder program, and any program with the reminder function for providing reminders. The reminder program may have a displaying function and an alarm presenting function for presenting reminders provided by the reminding program, and may also have functions of a reminder program in the operating system.

During or after the shutdown state, the wakeup instruction may be received from a clock circuit included in the mobile device when a counting time is reached. The clock circuit includes a timer function, and during or after the shutdown state, the clock circuit may still be operational by receiving power from a power supply of the mobile device. Therefore, the clock circuit may count time in real time even during or after the shutdown state. The clock circuit may be a RTC (Real-Time Clock). The RTC provides a reliable time for the operating system, and in a power-off situation, the RTC may also operate continuously via power offered by a battery.

In step 102, a preset initialization operation may be executed according to a wakeup instruction, in which the preset initialization operation does not include starting an operating system.

The preset initialization operation may be an initialization operation which is set in advance, and the present initialization operation does not include starting the operating system, but may include a hardware initialization for initializing a hardware component of the mobile device. The hardware initialization may be, for example, a u-boot program configured to start initializations of RAM, storage mediums, display systems, audio systems, and other hardware components on the mobile device. Furthermore, after receiving the wakeup instruction, a power-on process for powering on the mobile device may be performed, a central process unit may be started, and the hardware initialization may be performed. Part of the u-boot program may include the downloading and running of executable files for initializing the hardware components, where the executable files may include the reminder program described herein. It follows that the hardware initialization according to the preset initialization operation may identify one or more specific hardware, or software, components for initialization while the mobile device is in the shutdown state. In order to save time during an initialization time, only a graphics card initialization, a sound card initialization, and a memory initialization may be performed. The preset initialization operation does not include starting the operating system, i.e. after receiving the wakeup instruction and performing the hardware initialization, the operating system is not started, and the preset reminder program is executed directly according to the pre-stored reminder event, such that the reminder provided for the reminder event is realized.

In step 103, the preset reminder program may be executed according to the pre-stored reminder event after the preset initialization operation is completed.

The pre-stored reminder event may be a reminder event pre-stored during a startup state.

In an implementation, the time for storing the reminder event may be set to be before shutdown of the mobile device. Before the shutdown, it is determined whether there is a reminder event, and if yes, the reminder event is written into a dedicated memory region. In the startup state, the user may set the reminder event via the reminder interface, and if a reminder event is detected before the shutdown and the reminder event has not been executed, the reminder event may be stored in the dedicated memory region. The dedicated memory region may be a dedicated memory region on a memory included in the mobile device, e.g. a pre-determined drive available on the mobile device, such as an F disk. The objective for storing the reminder event in the dedicated memory region is to obtain relevant information of the reminder event during or after the shutdown state when the operating system is not started. It follows that the reminder program may access a drive portion of a memory included with the mobile device even when the operating system is not running.

In another implementation, the reminder event may be written into the dedicated memory region when the user sets the reminder event. In the startup state, the user may set the reminder event via the reminder interface, and when the user chooses to remind of the reminder event only in the shutdown state, the reminder event may be written into the dedicated memory region when the user sets the reminder event. For example, when the user wants to get up at 7:00 am, the user may set an alarm event so that the alarm reminder goes off at 7:00 am. Usually, a cellphone is shut down before sleep, so the cellphone is in the shutdown state before the user gets up, and the cellphone will be started after the user gets up. In order to avoid interruption of the alarm if the user gets up earlier, the alarm event requirement set by the user for the alarm at 7:00 am may provide for: executing an alarm reminder at 7:00 am during or after the shutdown state, and not executing the alarm reminder at 7:00 am during the startup state. For this kind of alarm event, since the alarm reminder will not be performed during the startup state, the alarm reminder event may be written into the dedicated memory region accordingly when the user sets the alarm event.

The reminder event includes at least the reminder time of the event, e.g. when the reminder time is reached, a ring type reminder is performed directly according to a built-in ringtone of the mobile device. The reminder event may also include one or more of a reminder presentation content, a reminder presentation language, ring data, a vibration identification, and a repeat reminder presentation instruction.

The reminder presentation content is a specific content to be reminded of, which may be used to display or play. For example, in a calendar program, the user may set a specific reminder presentation content, such as: "The birthday of my wife, remember to buy some flowers". The reminder presentation language is a display language for the reminder presentation content, e.g. the reminder presentation language may be Chinese, English, and Japanese etc. When the reminder presentation content is to be displayed, the reminder presentation content may be displayed in the reminder presentation language, and when the reminder presentation content is to be played audibly, the reminder presentation content may be played in the reminder presentation language.

In the above embodiments, the wakeup instruction is received from the clock circuit during or after the shutdown state, the preset initialization operation is executed according to the wakeup instruction, and the preset reminder program is executed according to the pre-stored reminder event after the preset initialization operation is completed, such that the reminder event may still be reminded of even if the operating system is not started, a time-consuming problem and an electricity-consuming problem caused by starting the operating system may be avoided, and the electric energy may be saved, and meanwhile a call function will not be started, a radiofrequency radiation may be prevented, and the user experience is improved.

Figure 2A:
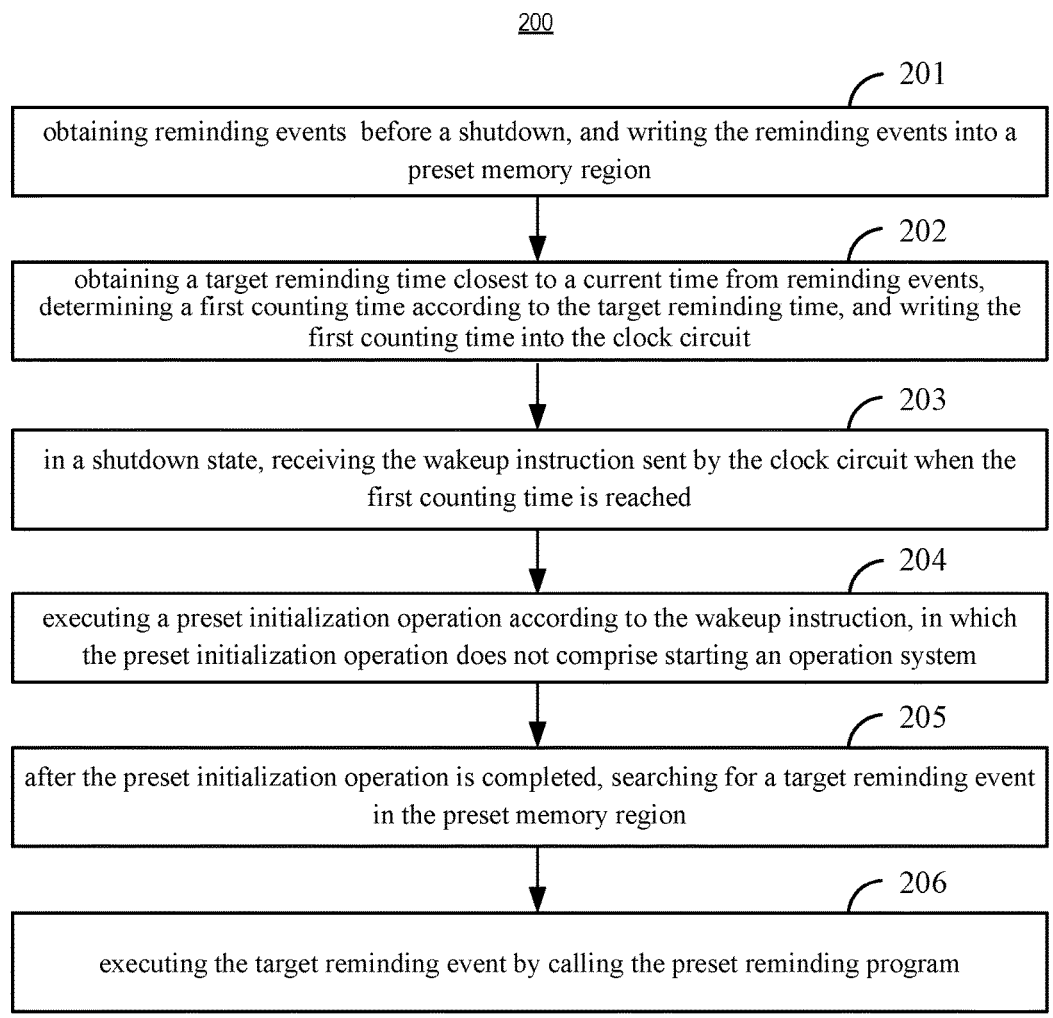
FIG. 2A illustrates a flow chart of another method for providing a reminder while a device is in a shutdown state according to an example embodiment of the present disclosure.

FIG. 2A shows a flow diagram 200 describing another method for providing a reminder during or after a shutdown state of a mobile device according to an example embodiment of the present disclosure. As shown in FIG. 2A, the method may be used in the mobile device, including steps as follows.

In step 201, reminder events are obtained before a shutdown of the mobile device, and the reminder events are written into a pre-determined memory region.

The mobile device in the present disclosure may be for example, a smart phone, a tablet computing device, a PDA (Personal Digital Assistant) computing device, or other computing device.

In the mobile device, a reminder program, which is not dependent upon an operating system and may operate independently, is installed on the mobile device with preset configurations. The preset reminder program is configured for providing reminders. For example, the reminder program may be an alarm program, a calendar program, a reminder program, and any program with the reminder function for providing reminders. The reminder program may have a displaying function and an alarm presenting function for presenting reminders provided by the reminding program, and may also have functions of a reminder program in the operating system.

Before the shutdown, the unprocessed reminder events may be obtained, and the reminder event may include information related to a reminder function, e.g. a reminder presentation time, a reminder presentation content, a reminder presentation language, ring data, and a vibration identification.

The dedicated memory region may be a pre-determined memory region on a memory included in the mobile device, e.g. a pre-determined drive available on the mobile device, such as an E disk. After the reminder event is obtained, the reminder event may be stored in the dedicated memory region.

In step 202, a target reminder time closest to a current time is obtained from reminder events, a first counting time is determined according to the target reminder time, and the first counting time is written into the clock circuit.

Since the reminder events obtained are unprocessed events where the corresponding reminder event have not yet been executed, the target reminder time closest to the current time may be obtained from the reminder events after the reminder events are obtained, i.e. the reminder time of the next closest upcoming reminder event is obtained and assigned as the target reminder time so that the reminder time of the next closest upcoming reminder event is determined to be the target reminder time. After the target reminder time is determined, the first counting time for a clock circuit of the mobile device may be determined in view of the target reminder time.

If a time consumed in the preset initialization operation process cannot be neglected, a reserved time may be determined according to a recorded time consumed in the preset initialization operation process, and a first counting time may be obtained by calculating the target reminder time minus the current time and minus the reserved time. For example, the current time is 12:00, the target reminder time is 13:00, a time difference between the target reminder time and the current time is obtained as 60 minutes, the reserved time may be 10 seconds, and then the first counting time is 59 minutes and 50 seconds. The first counting time is written into the clock circuit, and the clock circuit may start counting and send a wakeup instruction when 59 minutes and 50 seconds is reached. For the clock circuit that can determine the current time, the time difference between the target reminder time and the reserved time may be directly determined as the first counting time, and then the first counting time is made accessible to the clock circuit, such that the clock circuit sends the wakeup instruction when the first counting time is reached.

If the time consumed in the preset initialization operation process can be neglected, the time difference between the target reminder time and the current time may be determined as being equivalent to the first counting time, or the target reminder time may be directly determined as being equivalent to the first counting time, and then the first counting time is made accessible to the clock circuit, such that the clock circuit sends the wakeup instruction when the first counting time is reached.

It should be understood that, the current time in the present disclosure is a time corresponding to the present moment, and is a time in the present process state.

In step 203, during or after the shutdown state, the wakeup instruction sent by the clock circuit when the first counting time is reached is received.

In step 204, the preset initialization operation is executed according to the wakeup instruction, in which the preset initialization operation does not include starting the operating system.

After receiving the wakeup instruction, the power on process for powering on the mobile device is performed, a central process unit is started, and the hardware initialization is performed. In order to save time during an initialization time, only a graphics card initialization, a sound card initialization, and a memory initialization may be performed. The preset initialization operation does not include starting the operating system, i.e. after receiving the wakeup instruction and perform the hardware initialization, the operating system is not started, but the preset reminder program is executed directly by the pre-stored reminder event, such that the reminder presentation content for the reminder event is realized.

In step 205, after the preset initialization operation is completed, the target reminder event is searched for in a dedicated memory region.

After the preset initialization operation is completed, the reminder event stored in the dedicated memory region is obtained; if there is only one reminder event in the dedicated memory region, the reminder event is obtained, and the obtained reminder event is determined as the target reminder event. If there are multiple reminder events in the dedicated memory region, and each reminder event includes at least one reminder time, then the target reminder event (the target reminder event corresponding to the target reminder time) is determined to be the reminder time closest to the current time from the reminder events stored in the dedicated memory region, i.e. a reminder time closest to the current time is obtained, and the reminder event corresponding to the closest reminder time is regarded as the target reminder event.

In step 206, the target reminder event is executed by calling the preset reminder program.

The preset reminder program may be called to execute the target reminder event in the present disclosure. The reminder program may provide a reminder based on the target reminder event when the reminder program is activated by the execution of the target reminder event, and may also obtain the current time and remind of the target reminder event when the current time is identical with the reminder time of the target reminder event.

In an alternative implementation, executing the target reminder event includes at least one of the following methods.

In a first way, a reminder presentation content for the target reminder event may be obtained, and the reminder presentation content may be presented on the mobile device.

When setting the reminder event, the user may set the reminder presentation content, where the reminder presentation content specifically describes specific content which the user will be reminded of Exemplary formats of the reminder presentation content may be a text presentation format, a picture presentation display, an animation presentation form, and may also be a sound output format, among other formats for presenting content. The reminder presentation content may include content with one format, and may also include content that includes one or more formats. When the reminder presentation time is reached, the text, the picture, the animation, or another format corresponding to the reminder event may be displayed for a display based content, audibly played for a sound based content, or both displayed and audibly played for content that includes both display and audible content.

In a second way, a reminder presentation language for the target reminder event may be obtained, and the reminder presentation content may be presented on the mobile device in the reminder presentation language.

When setting the reminder event, the user may choose the reminder presentation language, e.g. Chinese, English, Korean, or other known language. The reminder presentation content may be preset, and may also be set when the user sets the reminder event. After the reminder presentation language is obtained, the reminder presentation content may be translated into the reminder presentation language when the reminder presentation is not currently in the reminder presentation language, and then the reminder event is executed. Illustration may be made by taking the preset content as an example of the reminder presentation content.

Figure 2B:
FIG. 2B illustrates a schematic diagram of an alarm clock presenting a reminder interface with Chinese as a reminder presentation language according to an example embodiment of the present disclosure.
Figure 2C:
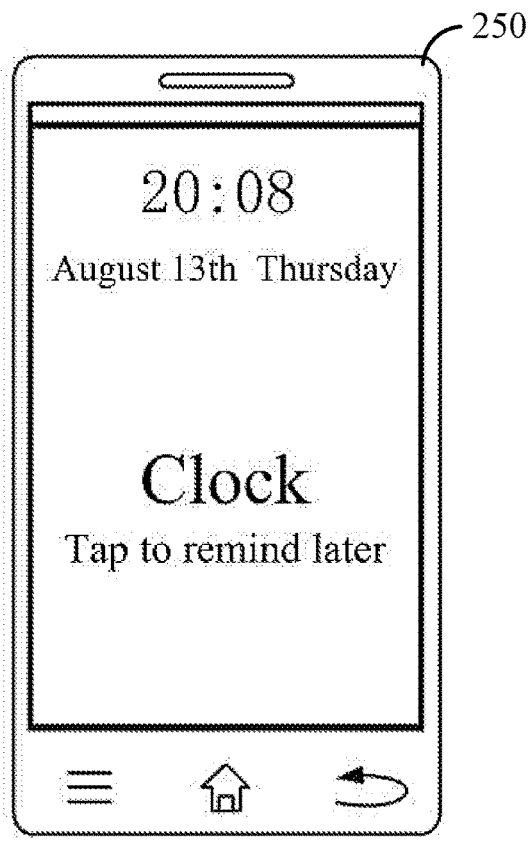
FIG. 2C illustrates a schematic diagram of an alarm clock reminder interface with English as a reminder presentation language according to an example embodiment of the present disclosure.

When the reminder program is the alarm program, the reminder presentation content may be preset. FIG. 2B illustrates a schematic diagram of a mobile device 250 displaying an alarm clock reminder interface with Chinese as a reminder presentation language according to an example embodiment of the present disclosure. As illustrated in FIG. 2B, if the reminder presentation language is Chinese, it may be determined whether the current reminder presentation content is in Chinese, and if yes, the reminder presentation contents "20:08", "8 月 13 日 星期四", "闹钟", and "轻按米粒后提醒" are controlled to be directly displayed on an alarm reminder interface. FIG. 2C illustrates a schematic diagram of the mobile device 250 displaying an alarm clock reminder interface with English as a reminder presentation language according to an example embodiment of the present disclosure. As illustrated in FIG. 2C, if the reminder presentation language is English, it is determined whether the current reminder presentation content is in English, and if no, the reminder presentation content is translated to English, and the translated reminder presentation contents "20:08", "August 13th Thursday", "Clock", and "Tap to remind later" may be displayed on the alarm reminder interface.

Illustration will be made below by taking the reminder presentation content selected by the user when setting the reminder event as an example of the reminder presentation content.

Figure 2D:
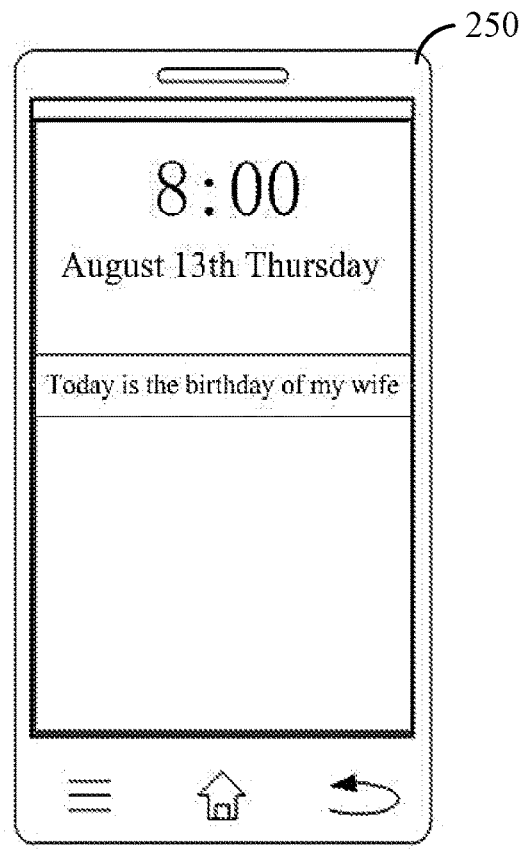
FIG. 2D illustrates a schematic diagram of a calendar reminder interface with English as a reminder language according to an example embodiment of the present disclosure.

When the reminder program is the calendar program or the reminder program, the reminder presentation content may be set by the user. FIG. 2D illustrates a schematic diagram of the mobile device 250 displaying a calendar reminder interface with English as a reminder presentation language according to an example embodiment of the present disclosure. As shown in FIG. 2D, if the reminder presentation language is English, it is determined whether the current reminder presentation content is in English, and if no, the reminder presentation content stored is translated to English, and the reminder presentation contents "8:00", "August 13th Thursday" and "Today is the birthday of my wife" are displayed on the calendar reminder interface.

It should be understood that, the formats of the reminder presentation content may be the text format, the picture display, the animation form, and may also be the sound format. When the content format is in an audible playing format, the reminder presentation content may be played in the reminder language.

In a third way, ring data corresponding to a ring type reminder for the target reminder presentation event may be obtained, and the ring data may be played on the mobile device.

A target reminding application may be a reminder application having an audible playing or an image displaying function; in order to save memory space, a fixed ring or image display content may be stored. Before the shutdown, if the user sets a ring different from the fixed ring, then the ring data corresponding to the ring set by the user may be obtained, and the ring data may be divided into the target reminder event and stored in the dedicated memory region. When the reminder time is reached, the ring data may be referenced to play, such that the preset reminder program may be avoided from storing a larger number of ring data, and memory storage resources are saved.

In a fourth way, a vibration identification for the target reminder event may be obtained, and a vibration reminder may be performed according to the vibration identification on the mobile device. The vibration may be achieved by activating a vibrating motor included in the mobile device.

The vibration identification may include information for identifying a vibration pattern and/or vibration motor activation length.

In the above way, a vibration indicator may be used to identify whether the vibration is to be performed when the reminder event is executed. Before the shutdown, the user may set whether the vibration is to be performed when the reminder event is executed. When the user determines the vibration is to be performed, the vibration indicator may identify the vibration identification has been activated, and when the user determines the vibration is not to be performed, the vibration indicator may identify a non-vibration identification indicating vibration has been disabled. For example, the vibration identification may be represented by a numerical digit such as '1', and the non-vibration identification may be represented by a different numerical digit such as '0'. The vibration identification may be divided into the target reminder event and stored in the dedicated memory region. When the reminder time is reached, the vibration indicator may be used to determine whether the vibration is to be performed, and a vibration reminder may be performed according to the vibration identification when the vibration identification is obtained. For example, when the vibration identification identifies a '1', the vibration function may be implemented on the mobile device. When the non-vibration identification identifies a '0', the vibration function may not be implemented, or suppressed, on the mobile device.

In the above embodiment, when the vibration identification is obtained, the vibration reminder may be performed according to the vibration identification or non-vibration identification, such that the vibration reminder is realized.

In a fifth way, a repeat reminder instruction for the target reminder event may be obtained, and a repeat reminder function may be performed according to the repeat reminder instruction on the mobile device.

The repeat reminder instruction may be used to identify a repeat reminder and an interval of the repeat reminder. Before the shutdown, the user may set whether the repeat reminder is to be performed, when the user determines the repeat reminder is to be performed, the interval of the repeat reminder may be determined accordingly, and also a fixed repeat interval of the repeat reminder may be obtained. The repeat reminder instruction may be divided into the target reminder event and stored in the dedicated memory region. When the reminder time is reached, a repeat reminder may be performed according to the repeat reminder instruction on the mobile device.

In the above embodiment, the repeat reminder is realized according to the repeat reminder instruction.

In an alternative implementation, after executing the target reminder event by implementing the preset reminder program, the method may further include: obtaining a new target reminder time that is closest in upcoming time to the current time from one or more unexecuted reminder events after the target reminder event has been completed; determining a second counting time according to the new target reminder time; making the second counting time accessible to the clock circuit; and performing a shutdown operation on the mobile device according to the second counting time.

The method for calculating the second counting time may be the same, or share one or more processes, with the method for calculating the first counting time, which shall not be further elaborated herein. After the target reminder event is completed, the target reminder event completed may be deleted from memory, and target reminder events that are identified as being completed may also be marked as executed. The new target reminder time closest to the current time may be obtained from unexecuted reminder events, the second counting time may be determined according to the new target reminder time, the second counting time may be made accessible by the clock circuit, and the shutdown may be performed on the mobile device according to the second counting time, such that the reminder for the unexecuted reminder events may be performed during or after the shutdown state, and also the electricity-consumption of the mobile device may be reduced.

In an alternative implementation, after executing the target reminder event by implementing the preset reminder program, the method may further include: identifying the target reminder events that are identified as being completed may be identified by an executed identification marker. Reminder events may be obtained from the dedicated memory region after a startup operation is implemented by the mobile device, and a database corresponding to the reminder program included in the operating system may be updated according to the identifications of the reminder events.

In the above embodiments, the reminder program may be set in the operating system, and the reminder program may perform a reminder according to contents in the database. With the method, data stored in the dedicated memory region may be updated synchronously into the database, such that the reminder for the unexecuted reminder events may be performed after the startup, and missed reminders may be avoided.

Figure 3:
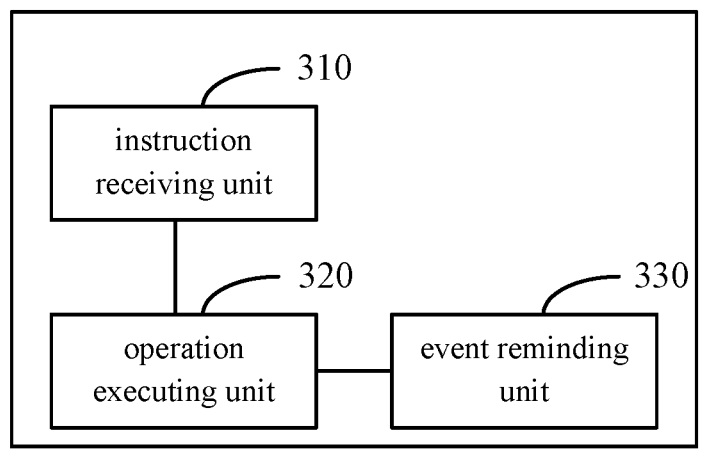
FIG. 3 illustrates a block diagram of a device for providing a reminder while a device is in a shutdown state according to an example embodiment of the present disclosure.

FIG. 3 illustrates a block diagram of a device 300 for providing a reminder in a shutdown state of the device 300 according to an example embodiment of the present disclosure. The device 300 may be included as part of a smart mobile device system, and include an instruction receiving unit 310, an operation executing unit 320, and an event reminder unit 330.

The instruction receiving unit 310 may be configured to receive a wakeup instruction from a clock circuit during or after a shutdown state of the device 300.

The operation executing unit 320 may be configured to execute a preset initialization operation according to the wakeup instruction, in which the preset initialization operation does not comprise starting an operating system by the device 300.

The event reminder unit 330 may be configured to execute a preset reminder program according to a pre-stored reminder event after the preset initialization operation is completed by the device 300.

In the above embodiments, the wakeup instruction may be received from a clock circuit of the device 300 in the shutdown state, the preset initialization operation may be executed according to the wakeup instruction, and the preset reminder program may be executed according to the pre-stored reminder event after the preset initialization operation is completed by the device 300, such that the reminder event may still be executed to provide the reminder even when the operating system is not started by the device 300. A time-consuming problem and an electricity-consuming problem caused by starting the operating system may be avoided, the electric energy may be saved, and meanwhile a call function will not be started, a radiofrequency radiation may be prevented, and the user experience is improved.

Figure 4:
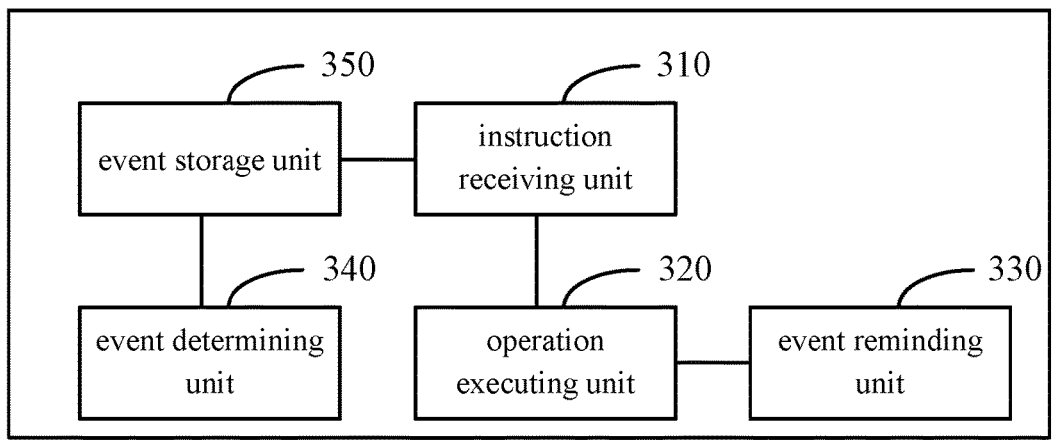
FIG. 4 illustrates a block diagram of a device for providing a reminder while a device is in a shutdown state according to example embodiments of the present disclosure.

FIG. 4 illustrates a block diagram of another device 400 for providing a reminder during or after a shutdown state of the device according to an example embodiment of the present disclosure. With reference to the device 300 and embodiment described with reference to FIG. 3, the device 400 may further include: an event determining unit 340 and an event memory unit 350.

The event determining unit 340 may be configured to determine whether there is a reminder event before a shutdown of the device 400.

The event storage unit 350 may be configured to write the reminder events into a dedicated memory region if there is a reminder event.

In the above embodiments, by determining whether there is a reminder event before the shutdown, and storing the reminder event into the dedicated memory region, the reminder event may still be reminded of even when the operating system is not started, and the reminder content for the reminder event is realized.

Figure 5:
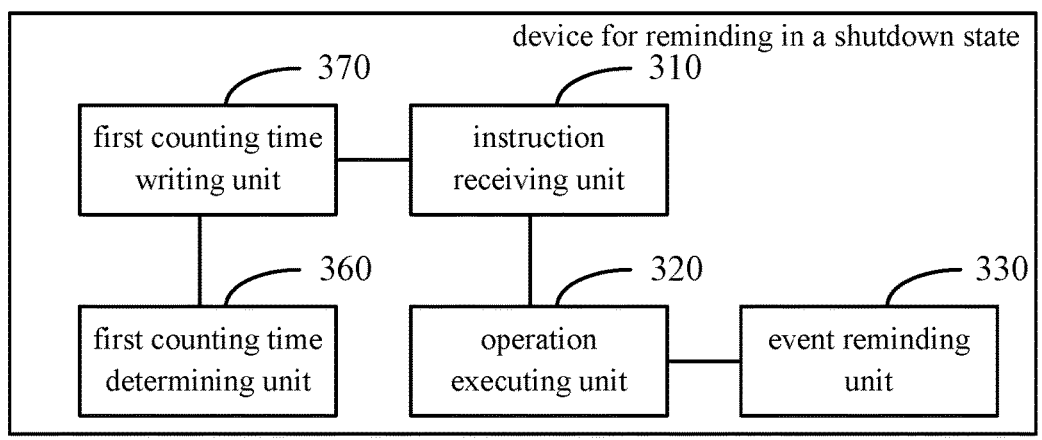
FIG. 5 illustrates a block diagram of a device for providing a reminder while a device is in a shutdown state according to example embodiments of the present disclosure.

FIG. 5 illustrates a block diagram of another device 500 for providing a reminder in a shutdown state of the device according to an example embodiment of the present disclosure. With reference to the device 300 and embodiment described with reference to FIG. 3, the device 500 may further include: a first counting time determining unit 360 and a first counting time writing unit 370.

The first counting time determining unit 360 may be configured to obtain a target reminder time closest to a current time from reminder events before the shutdown, and to determine a first counting time according to the target reminder time.

The first counting time writing unit 370 may be configured to write the first counting time into the clock circuit or otherwise make the first counting time accessible to the clock circuit.

The instruction receiving unit may be configured to receive the wakeup instruction sent by the clock circuit when the first counting time is reached.

In the above embodiments, the first counting time may be determined according to the target reminder time closest to the current time, and the first counting time may be written into the clock circuit or otherwise made available to the clock circuit, such that the wakeup instruction sent by the clock circuit when the first counting time is reached is received, and the reminder provided for the reminder event with the earliest reminder time is realized. Meanwhile, the single counting time being written into the clock circuit may reduce a cost of the clock circuit.

Figure 6:
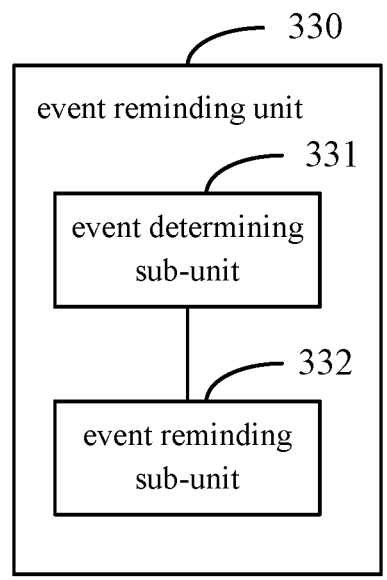
FIG. 6 illustrates a block diagram of a device for providing a reminder while a device is in a shutdown state according to example embodiments of the present disclosure.

FIG. 6 illustrates the event reminder unit 330, where the event reminder unit 330 may include: an event determining sub-unit 331 and an event reminder sub-unit 332.

The event determining sub-unit 331 may be configured to search for a target reminder event in a dedicated memory region.

The event reminder sub-unit 332 may be configured to execute the target reminder event by calling the preset reminder program.

In the above embodiments, the target reminder event may be found in the dedicated memory region, and the target reminder event may be executed by calling the preset reminder program, such that the reminder content for the target reminder event is realized.

Figure 7:
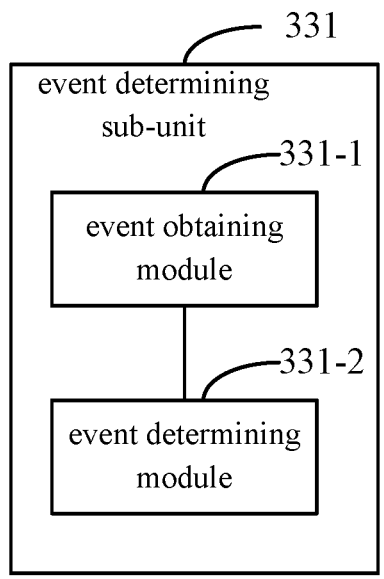
FIG. 7 illustrates a block diagram of a device for providing a reminder while a device is in a shutdown state according to example embodiments of the present disclosure.

FIG. 7 illustrates a block diagram of the event determining sub-unit 331, where the event determining sub-unit may include: an event obtaining module 331-1 and an event determining module 331-2.

The event obtaining module 331-1 may be configured to obtain reminder events stored in the dedicated memory region.

The event determining module 331-2 may be configured to obtain the target reminder event with a reminder time closest to a current time from the reminder events.

In the above embodiments, when there are multiple reminder events, the target reminder event with the reminder time closest to the current time may be obtained from the reminder events, such that the reminder event with the earliest reminder time is preferentially executed to present a reminder content corresponding to the executed reminder event.

Figure 8:
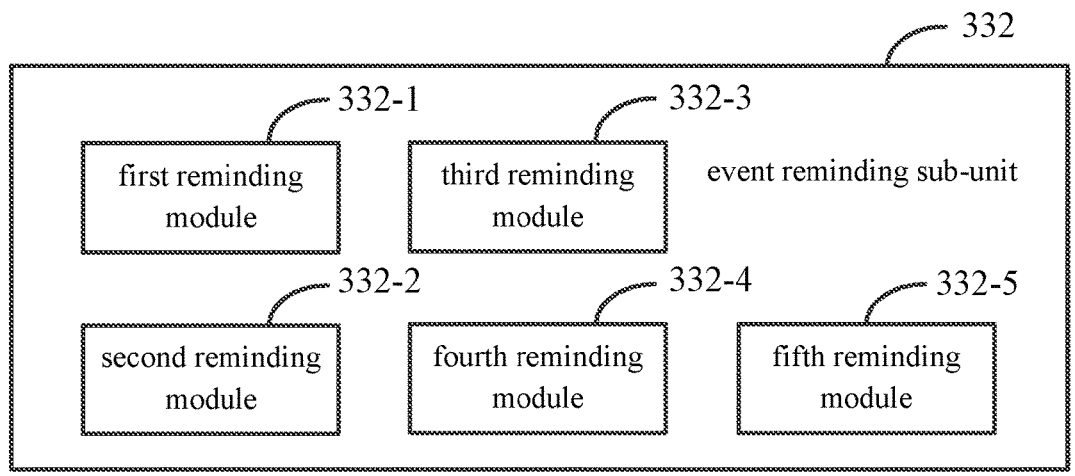
FIG. 8 illustrates a block diagram of a device for providing a reminder while a device is in a shutdown state according to example embodiments of the present disclosure.

FIG. 8 illustrates a block diagram of the event reminder sub-unit 332, where the event reminder sub-unit 332 may include at least one or more of the following: a first reminder module 332-1, a second reminder module 332-2, a third reminder module 332-3, a fourth reminder module 332-4, and a fifth reminder module 332-5. It should be noted that a module described herein may represent hardware, software, middleware, circuitry, or any combination thereof.

The first reminder module 332-1 may be configured to obtain reminder content for the target reminder event, and to present the reminder content.

The second reminder module 332-2 may be configured to obtain a reminder presentation language for the target reminder event, and to present the reminder of the reminder presentation content in the reminder presentation language.

The third reminder module 332-3 may be configured to obtain ring data for the target reminder event, and to play the ring data.

The fourth reminder module 332-4 may be configured to obtain a vibration identification for the target reminder event, and to perform a vibration reminder according to the vibration identification The fifth reminder module 332-5 may be configured to obtain a repeat reminder instruction for the target reminder event, and to perform a repeat reminder according to the repeat reminder instruction.

In the above embodiments, the reminder event may include the reminder presentation content, and the reminder presentation content set by the user may be presented on a mobile device; the reminder event may also include the reminder presentation language, and the language for the reminder presentation content may be may be translated to the reminder presentation language; the reminder event may also include ring data, and when the reminder time is reached, the ring data may be called to play, such that the preset reminder program may be avoided from storing a lot of ring data, thus saving resources; the reminder event may also include the vibration identification, the vibration reminder may be performed according to the vibration identification when the vibration identification is obtained, thus realizing the vibration reminder; and the reminder event may also include the repeat reminder instruction, and the repeat reminder may be realized according to the repeat reminder instruction. The users may choose a reminder way according to various demands, such that the user experience is improved.

Figure 9:
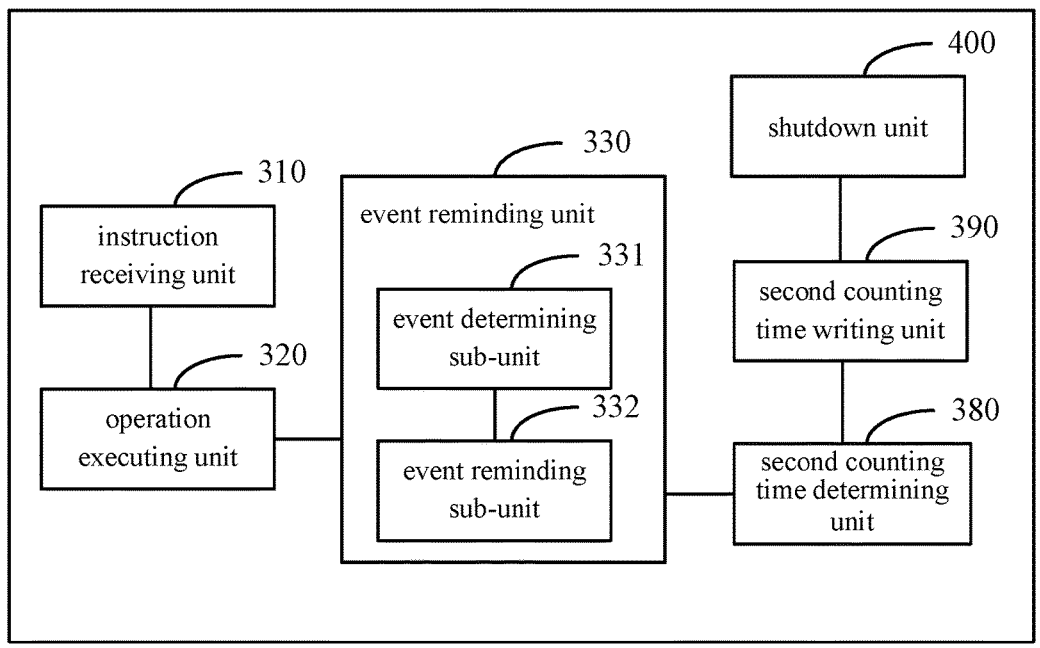
FIG. 9 illustrates a block diagram of a device for providing a reminder while a device is in a shutdown state according to example embodiments of the present disclosure.

FIG. 9 illustrates a block diagram of another device 900 for providing a reminder during or after a shutdown state of the device according to an example embodiment of the present disclosure. With reference to the device and embodiment described with reference to FIG. 6, the device 900 may further include: a second counting time determining unit 380, a second counting time writing unit 390 and a shutdown unit 400.

The second counting time determining unit 380 may be configured to obtain a new target reminder time that is determined to be closest to the current time from one or more unexecuted reminder events after the target reminder event is completed, and to determine a second counting time according to the new target reminder time.

The second counting time writing unit 390 may be configured to write the second counting time into a clock circuit of the device 900 or otherwise make the second counting time accessible by the clock circuit.

The shutdown unit 400 may be configured to perform a shutdown of the device 900.

In the above embodiments, the new target reminder time closest to the current time may be obtained from unexecuted reminder events, the second counting time may be determined according to the new target reminder time, the second counting time may be written into the clock circuit or otherwise make the second counting time accessible by the clock circuit, and then the shutdown may be performed, such that the reminder for the unexecuted reminder events may be performed during or after the shutdown state, and also the electricity-consumption is reduced.

Figure 10:
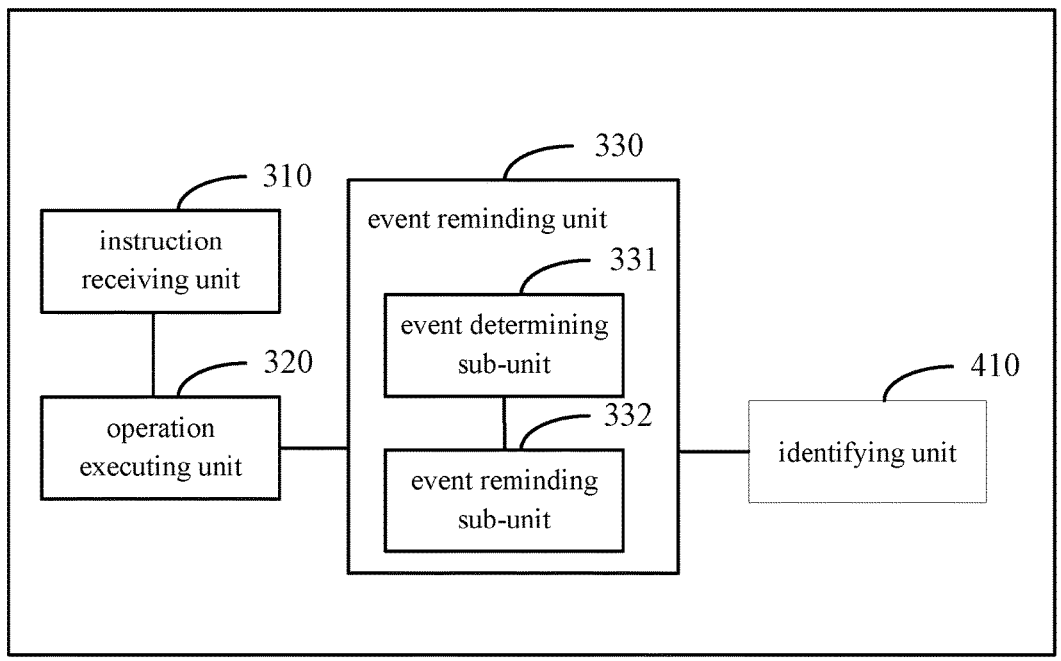
FIG. 10 illustrates a block diagram of a device for providing a reminder while a device is in a shutdown state according to example embodiments of the present disclosure.

FIG. 10 illustrates a block diagram of another device 1000 for providing a reminder during or after a shutdown state of the device according to an example embodiment of the present disclosure. With reference to the device and embodiment described with reference to FIG. 6, the device 1000 may further include: an identifying unit 410.

The identifying unit 410 may be configured to identify the target reminder event completed with an executed identification.

In the above embodiments, the target reminder event completed may be identified with the executed identification, which is convenient for the system to determine whether the target reminder event is executed via the identification.

Figure 11:
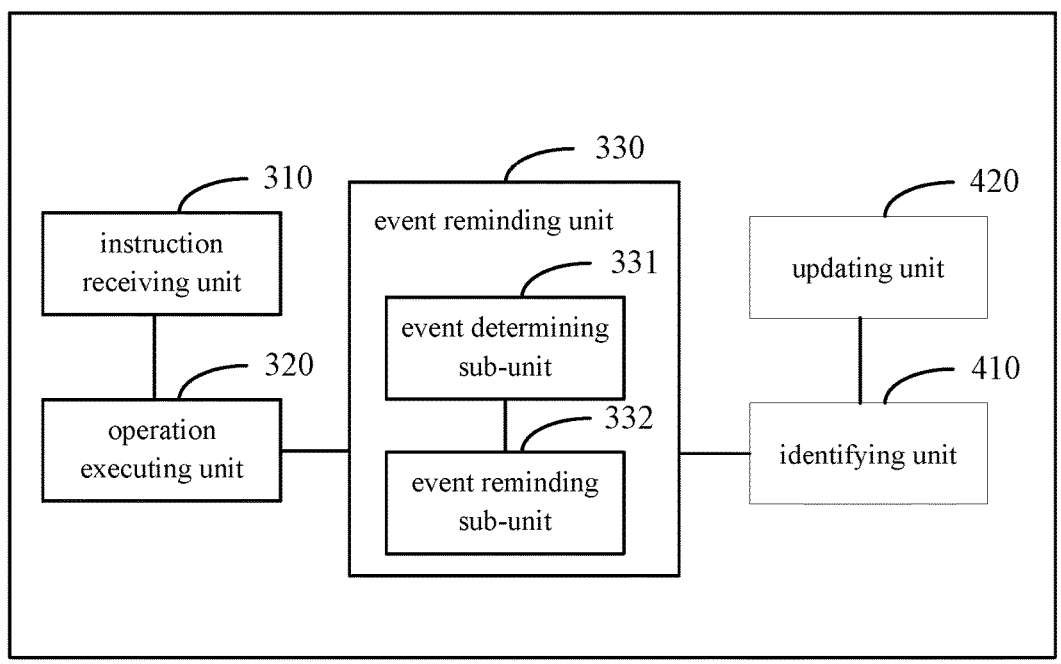
FIG. 11 illustrates a block diagram of a device for providing a reminder while a device is in a shutdown state according to example embodiments of the present disclosure.

FIG. 11 illustrates a block diagram of another device 1100 for providing a reminder during or after a shutdown state of the device according to an example embodiment of the present disclosure. With reference to the device and embodiment described with reference to FIG. 10, the device 1100 may further include: an updating unit 420.

The updating unit 420 may be configured to obtain reminder events from the dedicated memory region after a startup of the device, and to update a database corresponding to the reminder program in the operating system according to the identifications of the reminder events.

In the above embodiments, data stored in the dedicated memory region may be updated synchronously into the database, such that the reminder for the unexecuted reminder events may be performed after the startup, and a missed reminder may be avoided.

Accordingly, the present disclosure further provides another device for providing a reminder during or after a shutdown state of the device. The device may include a processor, and a memory configured to store instructions executable by the processor, in which, the processor may be configured to: receive a wakeup instruction from a clock circuit in a shutdown state; execute a preset initialization operation according to the wakeup instruction, in which the preset initialization operation does not include starting an operating system; and execute a preset reminder program according to a pre-stored reminder event after the preset initialization operation is completed.

With respect to the devices in the above embodiments, the specific operation modes of individual modules therein have been described in detail in the embodiments regarding the methods for reminder in a shutdown state, which will not be elaborated herein.

With respect to the device embodiments, relevant parts may be referred to the method embodiments since they are basically corresponding to the method embodiments. The device embodiments described above are merely illustrative, and units described as separate components may be or may not be physically separate, and components represented as units may be or may not be physical units, i.e., may be located at one place or may be distributed on multiple network units. Some or all of the modules may be chosen according to actual demands, for realizing the objectives of the present disclosure, which may be understood and implemented by those skilled in the art without creative labor.

Figure 12:
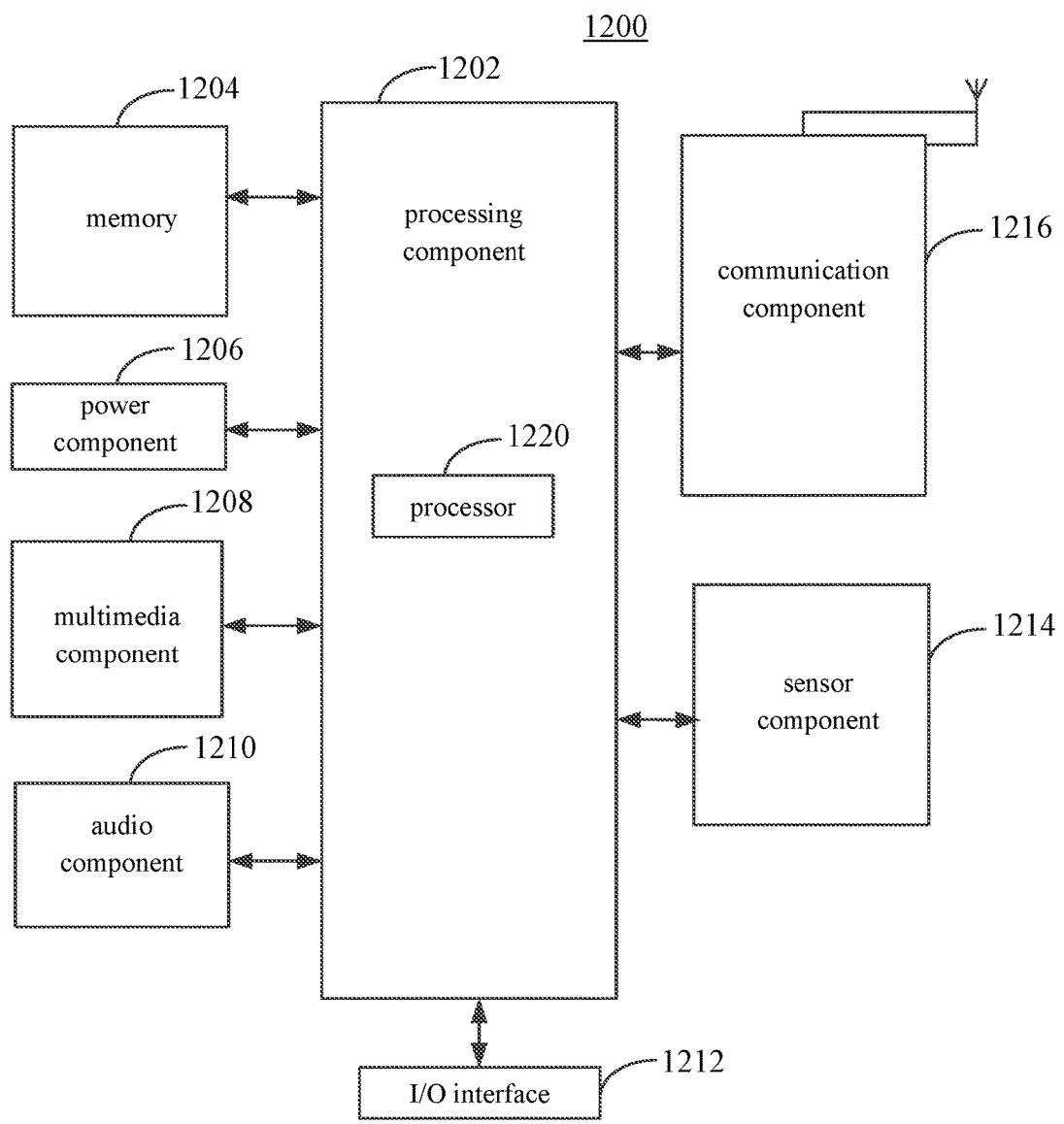
FIG. 12 is a block diagram of a device 1200 for providing a reminder while a device is in a shutdown state according to example embodiments of the present disclosure.

FIG. 12 illustrates a block diagram of a mobile device 1200 for providing a reminder during or after a shutdown state according to example embodiments of the present disclosure. For example, the mobile device 1200 may be a mobile phone, a computer, a digital broadcasting mobile device, a messaging device, a game console, a tablet device, a fitness equipment, a Personal Digital Assistant PDA, or another type of computing device system. The mobile device 1200 may be representative of any of the devices or mobile devices described herein.

Referring to FIG. 12, the mobile device 1200 may include a processing component 1202, a memory 1204, a power component 1206, a multimedia component 1208, an audio component 1210, an Input/Output (I/O) interface 1212, a sensor component 1214, and a communication component 1216.

The processing component 1202 may control overall operations of the mobile device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the mobile device 1200. Examples of such data include instructions for any applications or methods operated on the mobile device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the mobile device 1200. The power component 1206 may include a power management system, one or more power sources, and any other components associated with the generation, management, and distribution of power in the mobile device 1200.

The multimedia component 1208 includes a screen providing an output interface between the mobile device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1208 includes a front camera and/or a rear camera. The front camera and the rear camera may receive external multimedia data while the mobile device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the intelligent mobile device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface for the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the mobile device 1200. For instance, the sensor component 1214 may detect an open/closed status of the mobile device 1200 and relative positioning of components (e.g. the display and the keypad of the mobile device 1200). The sensor component 1214 may also detect a change in position of the mobile device 1200 or of a component in the mobile device 1200, a presence or absence of user contact with the mobile device 1200, an orientation or an acceleration/deceleration of the mobile device 1200, and a change in temperature of the mobile device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate wired or wireless communication between the mobile device 1200 and other devices. The mobile device 1200 can access a wireless network based on a communication standard, such as WIFI, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the mobile device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 1204 including instructions. The above instructions are executable by the processor 1220 in the mobile device 1200, for performing the methods and processes described herein. For example, the non-transitory computer-readable storage medium may be a ROM, a RAM, a CD-ROM, a magnetic tape, a floppy disc, an optical data storage device, and the like.

The non-transitory computer readable storage, when the instructions in the memory are executed by the processor in a mobile device, the mobile device may execute a method for providing a reminder during or after a shutdown state.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

Above descriptions are merely preferred embodiments of the present disclosure, but cannot be construed to limit the present disclosure, and changes, alternatives, and modifications can be made in the embodiments without departing from spirit, principles and scope of the present disclosure.

What is claimed is:

1. A method for providing a reminder on a mobile device, comprising:
   obtaining a target reminder time closest to a current time from a plurality of remaining reminder events scheduled to execute before a shutdown event of the mobile device;
   determining a first counting time according to the target reminder time;
   accessing, by a clock circuit of the mobile device, the first counting time;
   while the mobile device is in a shutdown state, receiving a wakeup instruction from the clock circuit of the mobile device when the first counting time is reached;
   executing a preset initialization operation according to the received wakeup instruction, wherein the preset initialization operation identifies one or more device components of the mobile device for initiating a wakeup process from the shutdown state;
   accessing a predetermined reminder event from a memory; and
   utilizing the one or more device components identified from the preset initialization operation to execute a preset reminder program on the mobile device according to the predetermined reminder event after the preset initialization operation.

2. The method of claim 1, further comprising:
   determining whether a remaining reminder event is scheduled to execute before a shutdown event of the mobile device; and
   storing the remaining reminder event into a dedicated memory region when the remaining reminder event is determined to be scheduled to execute before the shutdown event of the mobile device.

3. The method of claim 1, wherein executing the preset reminder program comprises:
   searching for a target reminder event in a dedicated memory region of the memory; and
   executing the target reminder event by implementing the preset reminder program.

4. The method of claim 3, wherein searching for the target reminder event comprises:
   obtaining a plurality of remaining reminder events stored in the dedicated memory region; and
   setting the target reminder event to be a remaining reminder event with a reminder time closest to a current time from the plurality of remaining reminder events.

5. The method of claim 3, wherein executing the target reminder event comprises at least one of:
   obtaining a reminder content for the target reminder event, and present the reminder content on the mobile device;
   obtaining a reminder language for the target reminder event, and present the reminder content in the reminder language on the mobile device;
   obtaining ring data for the target reminder event, and playing the ring data on the mobile device;
   obtaining a vibration identification for the target reminder event, and performing a vibration reminder according to the vibration identification on the mobile device; or
   obtaining a repeat reminder instruction for the target reminder event, and performing a repeat reminder according to the repeat reminder instruction on the mobile device.

6. The method of claim 3, wherein after executing the target reminder event, the method further comprising:
   obtaining a new target reminder time closest to the current time from unexecuted reminder events after the target reminder event is completed;
   determining a second counting time according to the new target reminder time;
   providing the second counting time to the clock circuit; and
   performing a shutdown operation on the mobile device based on the second counting time.

7. The method of claim 3, wherein after executing the target reminder event, the method further comprising: identifying the target reminder event completed with an executed identification.

8. The method of claim 7, further comprising:
   obtaining reminder events from the dedicated memory region after a startup operation on the mobile device; and
   updating a database corresponding to the reminder program in the operating system according to the identifications of the target reminder event.

9. A mobile device for providing a reminder during a shutdown state, comprising:
   a clock circuit configured to provide a timing signal;
   a processor; and
   a memory configured to include a dedicated memory region;

wherein the processor is configured to:
  obtain a target reminder time closest to a current time from a plurality of remaining reminder events scheduled to execute before a shutdown event of the mobile device, and
  determine a first counting time according to the target reminder time;
  access, by the clock circuit, the first counting time;
  while the mobile device is in a shutdown state, receive a wakeup instruction from the clock circuit;
  execute a preset initialization operation according to the received wakeup instruction, wherein the preset initialization operation identifies one or more device components of the mobile device for initiating a wakeup process from the shutdown state;
  access a predetermined reminder event from a memory; and
  utilize the one or more device components identified from the preset initialization operation to execute a preset reminder program on the mobile device according to the predetermined reminder event after the preset initialization operation.

10. The mobile device of claim 9, wherein the processor is further configured to:
  determine whether a remaining reminder event is scheduled to execute before a shutdown event of the mobile device; and
  store the remaining reminder event into the dedicated memory region when the remaining reminder event is determined to be scheduled to execute before the shutdown event of the mobile device.

11. The mobile device of claim 9, wherein, the processor is further configured to:
  search for a target reminder event in the dedicated memory region; and
  execute the target reminder event by implementing the preset reminder program.

12. The mobile device of claim 11, wherein, the processor is configured to:
  obtain remaining reminder events stored in the dedicated memory region; and
  set the target reminder event to be a remaining reminder event with a reminder time closest to a current time from the remaining reminder events.

13. The mobile device of claim 11, wherein the processor is configured to execute the target reminder event by controlling at least one of:
  obtaining a reminder content for the target reminder event, and present the reminder content on the mobile device;
  obtaining a reminder language for the target reminder event, and presenting the reminder content in the reminder language on the mobile device;
  obtaining ring data for the target reminder event, and playing the ring data on the mobile device;
  obtaining a vibration identification for the target reminder event, and performing a vibration reminder according to the vibration identification on the mobile device; or
  obtaining a repeat reminder instruction for the target reminder event, and performing a repeat reminder according to the repeat reminder instruction on the mobile device.

14. The mobile device of claim 11, wherein the processor is further configured to:
  obtain a new target reminder time closest to the current time from unexecuted reminder events after the target reminder event is completed, and determine a second counting time according to the new target reminder time; provide the second counting time to the clock circuit; and
  perform a shutdown operation on the mobile device based on the second counting time.

15. The mobile device of claim 11, wherein the processor is further configured to:
  identify the target reminder event completed with an executed identification.

16. The mobile device of claim 15, wherein the processor is further configured to:
  obtain reminder events from the dedicated memory region after a startup operation on the device and update a database corresponding to the reminder program in the operating system according to the identifications of the target reminder event.

17. A non-transitory computer readable storage medium having stored therein instructions that, when executed by a processor of a mobile device, cause the mobile device to perform a method for providing a reminder, the method comprising:
  obtaining a target reminder time closest to a current time from a plurality of remaining reminder events scheduled to execute before a shutdown event of the mobile device;
  determining a first counting time according to the target reminder time;
  accessing, by a clock circuit of the mobile device, the first counting time;
  while the mobile device is in a shutdown state, receiving a wakeup instruction from the clock circuit of the mobile device;
  executing a preset initialization operation according to the received wakeup instruction, wherein the preset initialization operation identifies one or more device components of the mobile device for initiating a wakeup process from the shutdown state;
  accessing a predetermined reminder event from a memory; and
  utilizing the one or more device components identified from the preset initialization operation to execute a preset reminder program on the mobile device according to the predetermined reminder event after the preset initialization operation.

* * * * *